Figure 1:
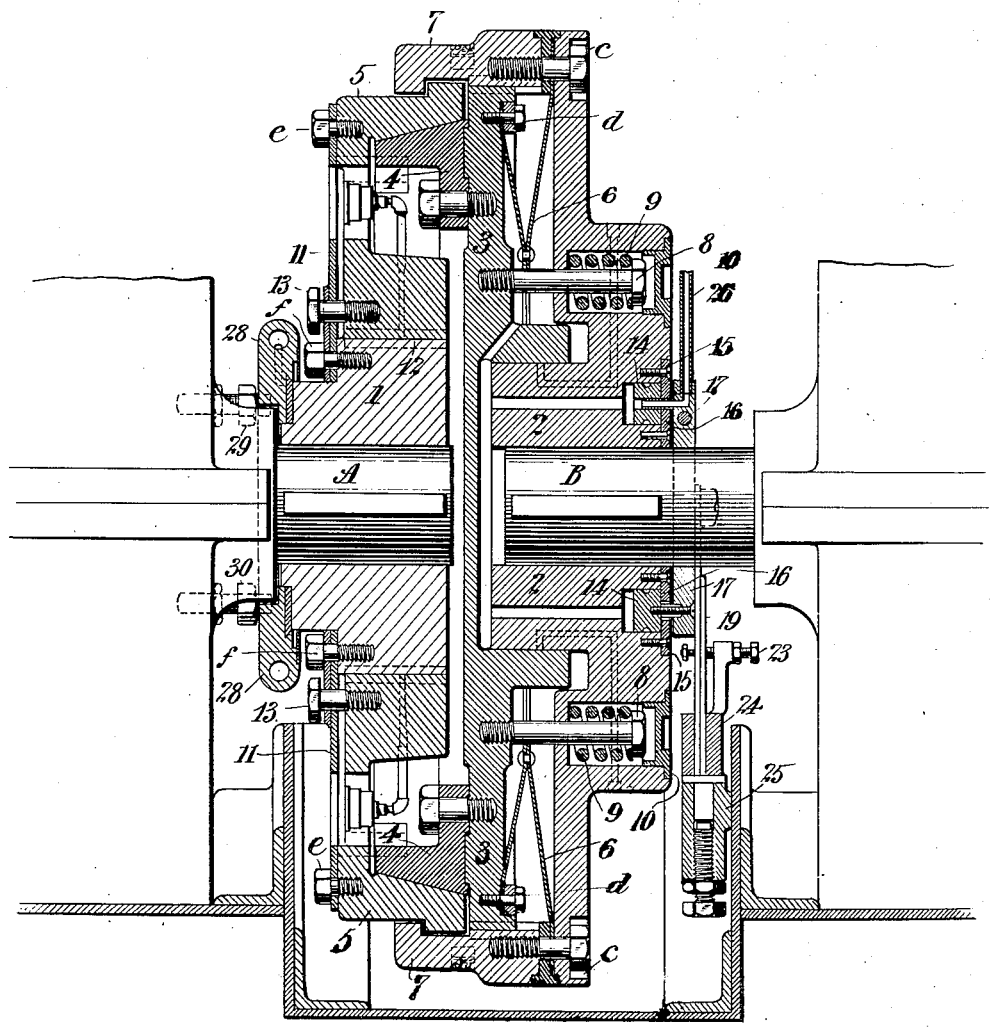

No. 848,379. PATENTED MAR. 26, 1907.
S. LAKE.
FRICTION CLUTCH.
APPLICATION FILED MAR. 2, 1906.

3 SHEETS—SHEET 1.

Witnesses
Frank S. Ober
Isaac Sonnemann

Inventor
Simon Lake,
By his Attorney
Henry J. Miller

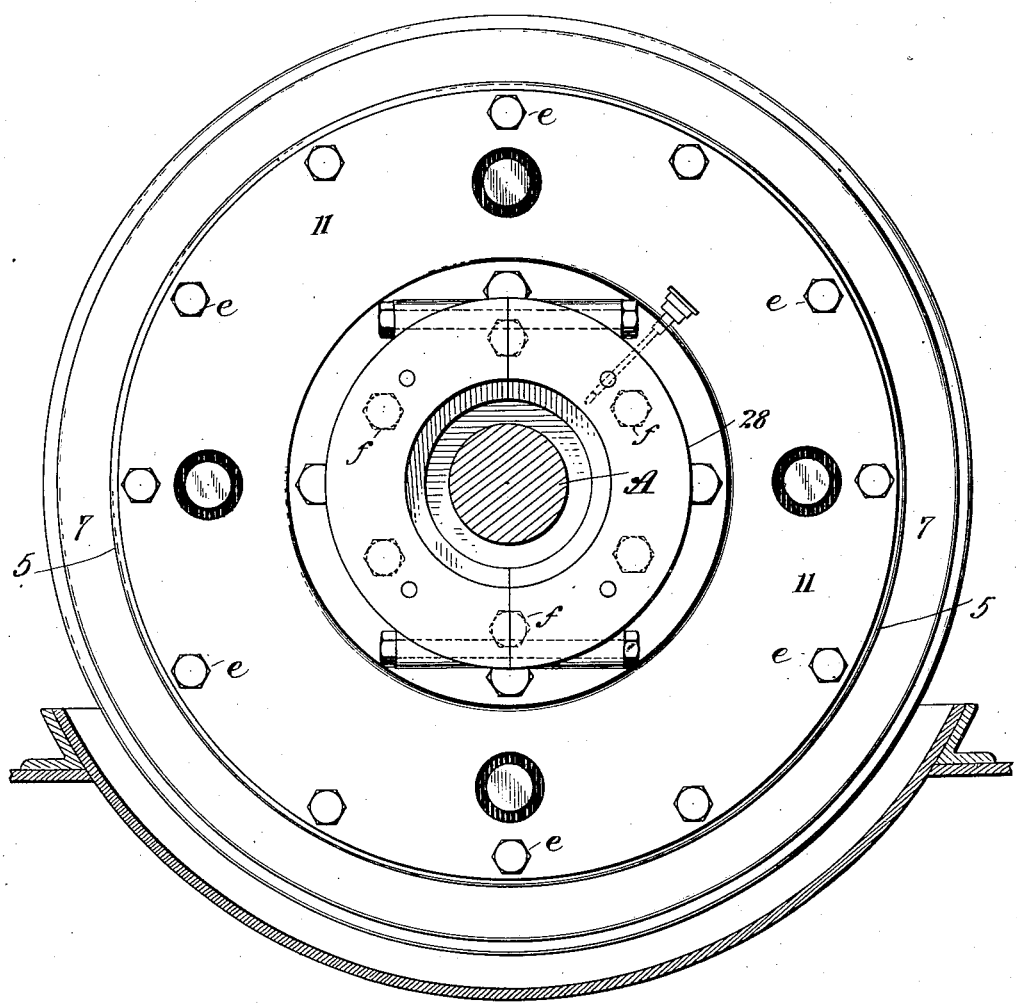

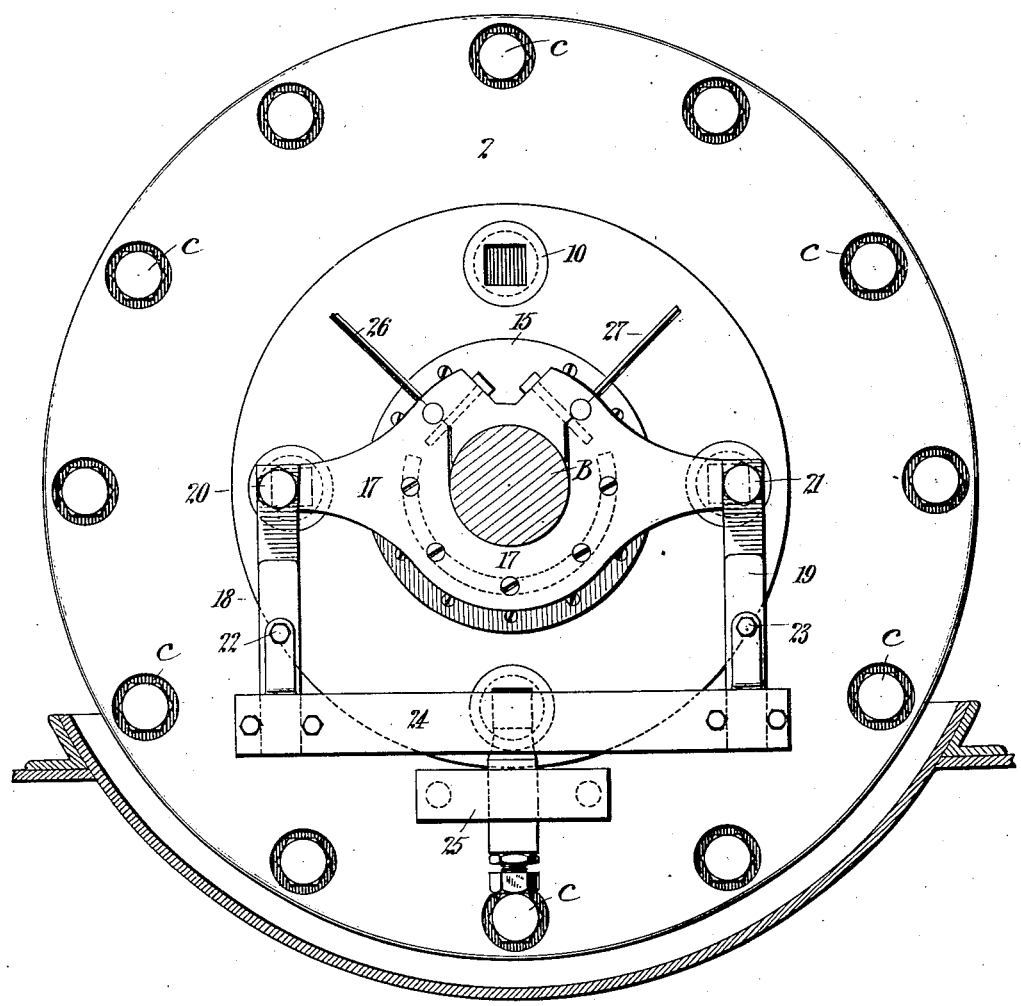

UNITED STATES PATENT OFFICE.

SIMON LAKE, OF BERLIN, GERMANY.

FRICTION-CLUTCH.

No. 848,379.　　　Specification of Letters Patent.　　　Patented March 26, 1907.

Application filed March 2, 1906. Serial No. 303,741.

*To all whom it may concern:*

Be it known that I, SIMON LAKE, a citizen of the United States of America, and a resident of Berlin, Germany, have invented a certain new and useful Improvement in Friction-Clutches, of which the following is a specification.

This invention relates to improvements in friction-clutches, and has for its primary object to provide a construction of clutch which will occupy comparatively small space and which will be capable of transmitting large powers with efficiency and reliability.

To this end the invention consists, broadly, in a clutch brought into and maintained in engagement by means of fluid under pressure acting in axial direction, the pressure being applied over as large an area as possible.

More particularly, the invention consists in a construction of clutch wherein one-half of the clutch carries what may be termed a "piston," between which and that half of the clutch is formed a fluid-tight space, so that on admission of compressed fluid to said space the piston is traversed axially and effects the engagement of the friction-surfaces.

The invention further consists in the provision of improved means for taking up end thrust and of improved means for preventing leakage of the compressed fluid, as hereinafter more particularly described.

Further objects will be apparent from the following description, in which reference is made to the accompanying sheets of drawings.

In the drawings, Figure 1 is a longitudinal vertical section showing one form of the improved clutch as adapted for transmitting rotary motion from one shaft to another. Figs. 2 and 3 are end views thereof.

In carrying the invention into practical effect I key the hub 1 of one half of the clutch securely to one shaft A and a disk 2, forming a member of the other half of the clutch, to the other shaft B. The disk 2 carries what I term a "piston" 3, which piston has formed integral therewith or bolted to one face a friction-cone 4. The said piston is capable of receiving a slight axial movement, which permits the male cone portion 4 to engage with the female carrying portion or conical bush 5, carried by the first-mentioned half of the clutch. Securely held between the disk 2 and a ring 7, hereinafter referred to, by means of bolts or pins $c$ is a diaphragm 6. The said diaphragm is also securely fastened to the piston 3 by means of bolts or pins $d$, which bolts extend all the way round the piston and the disk 2, so as to make the diaphragm fluid-tight, thus forming a fluid-tight space between the piston 3 and the disk 2. The bush 5 is provided with a flange over which hooks an internal flange formed on a ring 7, bolted to the disk 2. Pins or bolts 8 are screwed into the piston-head 3, and surrounding said bolts are helical springs 9 under compression, which tend to withdraw the piston 3 and cone 4 from the bush 5. The said bolts 8 move freely in the disk 2 and coöperate with the diaphragm in maintaining the angular relation between the disk 2 and piston 3, and so take the strain of driving the piston when the disk 2 is rotated. Plugs 10 are screwed into the disk 2 over the bolt-orifices, so as to render the same fluid-tight, since compressed fluid when admitted to the space between the piston 3 and disk 2 might otherwise leak past the bolts 8 and so escape.

A steel plate 11 is securely bolted to the hub 1 and the bush 5 by means of pins or bolts $e$ and $f$. The said plate 11 is comparatively thin, so as to act as a diaphragm and permit the bush 5 to receive a slight axial movement on the hub 1, (about one-eighth of an inch,) which is limited by the bolt-head 13.

A ring 14 fits snugly an annular groove turned out in the hub portion of the disk 2 and is held in place by rings 15 16 and by a number of small screws, as shown. Said ring 14 is held to a carrier-piece 17 by means of springs 18 19 and bolts 20 21 and is thus prevented from rotating with the shaft B. The tension of the said springs 18 19 may be adjusted by the set-screws 22 23, and said springs are securely fastened to the carrier 24, held in a bracket 25 and permitted to turn, so as to bring an equal tension on each of the springs.

A pipe 26 is led into the carrier-piece 17 and serves to conduct compressed fluid, such as air or any suitable liquid, into the fluid-tight annular space formed between the piston-head 3 and the disk 2. A pipe 27 also serves to introduce lubricating oil or grease into the annular groove surrounding the ring 14.

A thrust-ring 28 may be set up, by means of bolts 29 30, to form contact with the hub 1, as shown; but this is not essential.

The operation of the clutch is as follows: In the position shown in Fig. 1 the friction-cone 4 is just in contact with the bush 5, and the flange on the said bush 5 is slightly clear of the ring 7. On the introduction of additional air or other fluid into the annular space between the piston 3 and the disk 2 the piston will move the bush 5 endwise until the flange thereon engages the internal flange on the ring 7, thus permitting sufficient pressure in the said annular space to effect a positive drive between the two halves of the clutch. On relieving the pressure the springs 9 immediately withdraw the piston clear of the bush 5, which is also restored to its original position clear of the ring 7 by the plate 11, so that one half of the clutch can then revolve free from contact with the other half.

It is to be observed that this arrangement permits of utilizing nearly the full diameter of the clutch as a pressure-surface, so as to powerfully force the cone 4 into the socket of the bush 5, and thus cause very considerable friction at the points of contact between the bush 5 and the ring 7 and cone 4.

The fluid for operating the clutch may be supplied from an air or hydraulic system located at any convenient position and be controlled by a simple two-way cock. On turning the cock in one direction fluid is admitted to the space between the piston 3 and the disk 2, and the clutch is brought into engagement. On turning the cock the other way the pressure is relieved, and the springs 9 disengage the clutch. As soon as the fluid is turned on it forces the ring 14 back against the rings 15 16, thus forming a seating and preventing the escape of the fluid. The lubricating-oil acts as a packing where high pressures are used to prevent too great thrust coming upon the rings, which might produce cutting.

While I have described in the foregoing specification the construction of parts preferred, I am aware that numerous changes of construction and operation may be made without departing from the spirit of the invention, and I therefore do not wish myself to be understood as limiting myself by the positive terms employed in connection with the description, excepting such as the state of the art may require.

Having now described my invention, what I claim, and desire to secure by Letters Patent of the United States, is—

1. A friction-clutch, having an axially-movable member, and a yielding medium controlling the extent of said movement, and a complemental member, an axially-movable piston arranged in a fluid-pressure chamber in said complemental member, the clutching-face carried by said piston, means to admit fluid-pressure into the pressure-chamber to force one member into engagement with the other under a yielding action of the first-mentioned member, and spring connections between the piston and its member to disengage the clutching parts upon withdrawal of fluid-pressure.

2. The improved friction-clutch, comprising, in combination with the drive and the driven elements, an axially-movable piston carried by one element and adapted under the action of fluid-pressure to bring together the friction-surfaces, and resilient means for taking up end-thrust on said elements.

3. The improved friction-clutch, comprising, the combination with two rotary shafts of a disk carried by one shaft, an axially-slidable piston carried by said disk, a diaphragm connected to the piston and the disk and forming a fluid-tight space between said piston and said disk, and friction devices rotating with said shafts and brought into engagement by the axial movement of the piston.

4. The improved friction-clutch, comprising, in combination with two rotary shafts, a disk carried by one shaft, an axially-slidable piston carried by said disk, a diaphragm connected to the piston and the disk and forming a fluid-tight space between said piston and said disk, a friction-cone carried by said piston, a friction-bush slidable relative to the other shaft, and a flanged ring carried by said disk limiting the axial movement of said bush.

5. A friction-clutch, having a disk and a piston slidably mounted thereon and connected therewith by a diaphragm and retracting-springs, a clutch-ring carried by said piston, means to admit fluid-pressure between the disk and piston, and a complemental clutch member having a yielding clutching-piece engaged by the clutch-ring.

6. The improved friction-clutch, comprising, in combination with two rotary shafts, a disk carried by one shaft, an axially-movable piston carried by said disk, a diaphragm forming a fluid-tight space between said piston and said disk, a friction-cone carried by said piston, a friction-bush slidable relative to the other shaft, a flanged ring carried by said disk limiting the axial movement of said bush, bolts secured to the piston and entering said disk, and springs surrounding said bolts and pressing together said piston and said disk.

7. A friction-clutch, having a disk and a piston slidably mounted thereon and connected therewith by a diaphragm and retracting-springs, a clutch-ring carried by said piston, means to admit fluid-pressure between the disk and piston, including a ring movably fitted in a groove in the disk, and a carrier-piece to which the ring is fitted and through which the pressure-fluid is supplied, and a complemental clutch member having a yielding clutching-piece engaged by the clutch-ring.

8. A friction-clutch, having a disk and a piston slidably mounted thereon and connected therewith by a diaphragm and retracting-springs, a clutch-ring carried by said piston, means to admit fluid-pressure between the disk and piston, including a ring movably fitted in a groove in the disk, and a carrier-piece to which the ring is fitted and through which the pressure-fluid is supplied, a carrier for the carrier-piece and springs connecting them, and a complemental clutch member having a yielding clutching-piece engaged by the clutch-ring.

In testimony whereof I have signed my name to this specification in the presence of two subscribing witnesses.

SIMON LAKE.

Witnesses:
 HENRY HASPER,
 WOLDEMAR HAUPT.